United States Patent
Rozitis

(10) Patent No.: US 9,753,244 B2
(45) Date of Patent: Sep. 5, 2017

(54) POSITIONING MECHANISM FOR ALIGNING AN OPTICAL DEVICE AND AN IMAGE SENSOR

(75) Inventor: Peter Rozitis, Midland (CA)

(73) Assignee: Raytheon Canada Limited (CA)

( * ) Notice: Subject to any disclaimer, the term of this patent is extended or adjusted under 35 U.S.C. 154(b) by 646 days.

(21) Appl. No.: 13/446,553

(22) Filed: Apr. 13, 2012

(65) Prior Publication Data
US 2013/0271856 A1    Oct. 17, 2013

(51) Int. Cl.
*G02B 7/02* (2006.01)
*G03B 17/12* (2006.01)
(Continued)

(52) U.S. Cl.
CPC ............... *G02B 7/023* (2013.01); *G03B 5/00* (2013.01); *G03B 17/12* (2013.01); *G03B 43/00* (2013.01);
(Continued)

(58) Field of Classification Search
CPC  H01S 5/02248; H04N 5/2254; H04N 5/2253; H04N 5/23238; H04N 2213/001; H04N 5/2259; B60R 2001/1223; B60R 11/00; B60R 2011/0087; A61B 1/05; H01L 27/14625; H01L 27/14634; H01L 27/14647; H01L 33/0095; H01L 33/10; H01L 33/20; H01L 33/44; G01B 11/2425; G02B 7/023; G02B 27/64; G02B 7/00; G02B 7/003; G02B 7/022; G02B 7/026; G02B 7/1825; G02B 7/1827; G02B 7/10; G02B 21/362; G02B 2027/0138; G02B 21/242; G03B 9/36; G03B 9/40; G03B 9/42; G03B 17/14; G03B 17/565; G03B 19/12; G03B 2205/0046; G03B 3/10; G03B 17/56; G03B 13/00; G03B 13/24; G03B 17/12; F16M 13/022; F16M 11/2028; F16M 11/08; F16M 11/105; F16M 11/125; F16M 11/06; F16M 11/123; F16M 11/2035; F16M 11/2078
See application file for complete search history.

(56) References Cited

U.S. PATENT DOCUMENTS 4,433,824 A * 2/1984 Koosha .......................... 248/662
4,607,924 A * 8/1986 Vance ............................ 353/101
(Continued)

FOREIGN PATENT DOCUMENTS

EP           2592457 A1      5/2013
WO      WO 2012/004995 A1    1/2012
WO       WO2012013675    *   2/2012  ............. G03B 21/14

OTHER PUBLICATIONS

EP Application EP13154841; Filing date Feb. 11, 2013; Raytheon Company; European Search Report dated Feb. 4, 2014.

*Primary Examiner* — Alicia M Harrington

(57) ABSTRACT

A positioning mechanism for aligning an optical device and an image sensor is disclosed. The positioning mechanism includes a base operable with a support for an image sensor, a tube operable with an optical device, and an adjuster disposed between the base and the tube. In one aspect, the adjuster is positionable relative to the base in a translational degree of freedom and two rotational degrees of freedom. In another aspect, the tube is positionable relative to the adjuster in two translational degrees of freedom, and a rotational degree of freedom.

20 Claims, 4 Drawing Sheets

(51) Int. Cl.
*H04N 5/225* (2006.01)
*G03B 5/00* (2006.01)
*G03B 43/00* (2006.01)

(52) U.S. Cl.
CPC ......... *H04N 5/2253* (2013.01); *H04N 5/2254* (2013.01)

(56) References Cited

U.S. PATENT DOCUMENTS

| | | | |
|---|---|---|---|
| 6,806,899 B1 | 10/2004 | Schaack | |
| 2003/0227562 A1* | 12/2003 | Gouch et al. | 348/345 |
| 2005/0099520 A1* | 5/2005 | Cheng | 348/335 |
| 2006/0056077 A1* | 3/2006 | Johnston | 359/811 |
| 2006/0181786 A1 | 8/2006 | Chiang | |
| 2007/0020987 A1* | 1/2007 | Shirako et al. | 439/362 |
| 2008/0159734 A1* | 7/2008 | Westerweck et al. | 396/541 |
| 2010/0182397 A1* | 7/2010 | Choi et al. | 348/36 |
| 2012/0002306 A1 | 1/2012 | Takahashi | |

* cited by examiner

POSITIONING MECHANISM FOR ALIGNING AN OPTICAL DEVICE AND AN IMAGE SENSOR

BACKGROUND

A charge-coupled device (CCD) or complementary metal-oxide semiconductor (CMOS) image sensor is typically wave soldered onto a printed circuit board (PCB) using high precision production methods. The degree of precision in positioning and locating the image sensor on the PCB is therefore geared toward a suitable electrical contact quality. However, manufacturing precision that is acceptable for positioning electrical components is typically insufficient for properly positioning optical components. For example, the tolerances applied to the flatness of the PCB itself and the location of the PCB mounting holes in relation to the image sensor may suffice for electrical connections, but may be inadequate for optical alignment purposes. Assembling an image sensor on a PCB with a precision optical device can therefore require fine adjustment in up to six degrees of freedom: translation in three orthogonal axes and rotation about the three orthogonal axes.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
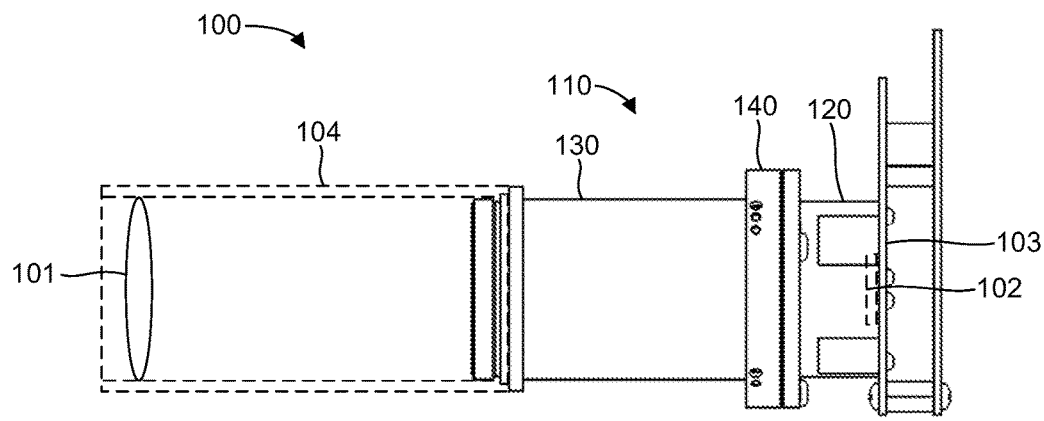
FIG. 1 is an example illustration of an optics system in accordance with an embodiment of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Although mechanisms exist for providing some adjustment at assembly of an image sensor on a PCB with an optical device, such mechanisms typically do not provide for adjustment in every pertinent degree of freedom. Additionally, these mechanisms may rely on external tooling for adjustment and maintaining relative positions of the PCB and optical device while an adhesive or cement bonds the PCB to the optical device. In this case, long term stability can be a concern due to shrinkage of the bonding cement over time.

Accordingly, a positioning mechanism for aligning an optical device and an image sensor is disclosed that provides proper and effective positioning adjustment with the structures that are used to couple the optical device to the image sensor. In one aspect, the positioning mechanism provides structural support for the alignment and coupling between the optical device and image sensor, therefore adhesive or bonding cement is not required to maintain relative positions between the optical device and image sensor. In some exemplary embodiments, the positioning mechanism can include a base operable with a support for an image sensor. The positioning mechanism can also include a tube operable with an optical device. Additionally, the positioning mechanism can include an adjuster disposed between the base and the tube. The adjuster can be positionable relative to the base in a translational degree of freedom and two rotational degrees of freedom. The tube can be positionable relative to the adjuster in two translational degrees of freedom, and a rotational degree of freedom.

An optics system is also disclosed. In some exemplary embodiments, the optics system can include an optical device, an image sensor mounted on a support, and a positioning mechanism for aligning the optical device and the image sensor. The positioning mechanism can include a base coupled to the image sensor support, a tube coupled to the optical device, and an adjuster disposed between the base and the tube. The adjuster can be positionable relative to the base in a translational degree of freedom and two rotational degrees of freedom. The tube can be positionable relative to the adjuster in at least two translational degrees of freedom, and a rotational degree of freedom to align the optical device relative to the image sensor.

A method of facilitating alignment of an optical device and an image sensor is also disclosed. In some embodiments, the method can comprise providing a positioning mechanism for aligning an optical device relative to an image sensor, the positioning mechanism having a base operable with a support for the image sensor, a tube operable with the optical device, and an adjuster disposed between the base and the tube. The method can further comprise facilitating movement of the adjuster relative to the base in a translational degree of freedom and two rotational degrees of freedom. Additionally, the method can comprise facilitating movement of the tube relative to the adjuster in two translational degrees of freedom, and a rotational degree of freedom.

One exemplary embodiment of an optics system 100 is illustrated in FIG. 1. The optics system 100 can comprise an optical device 101, an image sensor 102 mounted on a support 103, and a positioning mechanism 110 for aligning the optical device 101 and the image sensor 102. An optical device 101 can include a lens or any other type optical device. The image sensor can comprise a CCD or CMOS image sensor, which can be mounted on a support 103, such as a PCB. The positioning mechanism 110, also illustrated in FIGS. 2 and 3, can include a base 120 coupled to the image sensor support 103, a tube 130 coupled to the optical device 101, and an adjuster 140 disposed between the base 120 and the tube 130. In one aspect, the adjuster 140 can be positionable relative to the base 120 in at least one degree of freedom, as discussed hereinafter. In another aspect, the tube 130 can be positionable relative to the adjuster 140 in at least one degree of freedom, also discussed hereinafter. Such adjustability of the positioning mechanism 110 between the tube 130 and the adjuster 140 and between the adjuster 140 and the base 120 can be useful to align the optical device 101 relative to the image sensor 102. The positioning mechanism 110 can therefore account for position and/or orientation misalignments between the optical device 101 and the image sensor 102.

A distance between the optical device 101 and the image sensor 102 can be any suitable distance. For example, in one aspect, the optical device 101 can comprise a lens, and the distance between the optical device 101 and the image sensor 102 can be related to the focal length of the lens. Accordingly, an overall stacked length of the base 120, tube 130, and adjuster 140 can be sized to provide a suitable distance between the optical device 101 and the image sensor 102. In one aspect, the optics system 100 can include a spacer 104 coupled to the optical device 101 and disposed between the optical device 101 and the tube 130. The spacer 104 can be used to ensure a proper distance between the optical device 101 and the sensor 102.

The image sensor 102 and/or the optical device 101 may be sensitive to the presence of dust or other debris. Accordingly, in one aspect, the positioning mechanism 110 can form part of a substantially sealed enclosure for the image sensor 102 and the optical device 101. The positioning mechanism 100 can therefore include an O-ring 150 or other suitable sealing device that can be disposed between the base 120 and the adjuster 140 to prevent dust or debris from the passing between these components, particularly when a gap forms between the two components as the adjuster 140 is positioned and oriented relative to the base 120, as described hereinafter.

In one aspect, to provide for adjustability of position and/or orientation, the adjuster 140 can be positionable relative to the base 120 by at least one jack screw 160. In another aspect, the tube 130 can be positionable relative to the adjuster 140 by at least two set screws 170, 171. Operation and configurations of the jack screw and set screws will be discussed in more detail hereinafter. The positioning mechanism 110 can also include at least one fastener 180 to couple the adjuster 140 and the base 120. For example, the fastener 180 can be threaded into the adjuster 140 in order to secure the adjuster 140 to the base 120. In addition to providing for position and/or orientation adjustability, the set screws 170, 171 can also function to couple the tube 130 and the adjuster 140 as the screws interface with a groove 132 or channel of the tube 130.

Figure 2:
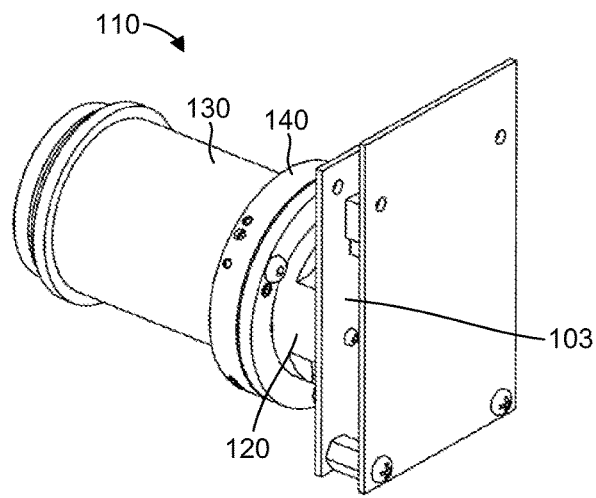
FIG. 2 is an example illustration of a positioning mechanism for aligning an optical device and an image sensor in accordance with an embodiment of the present disclosure.
Figure 3:
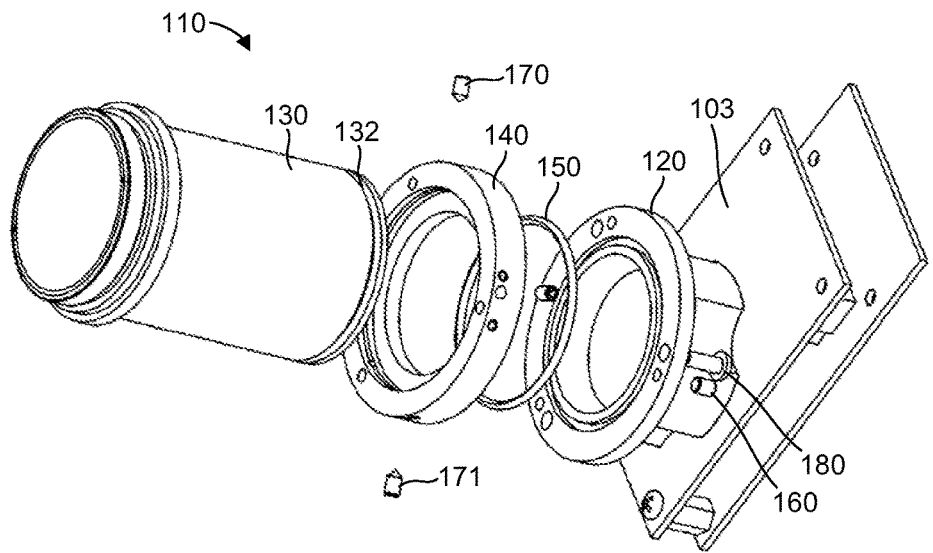
FIG. 3 is an exploded view of the positioning mechanism of FIG. 2.
Figure 4:
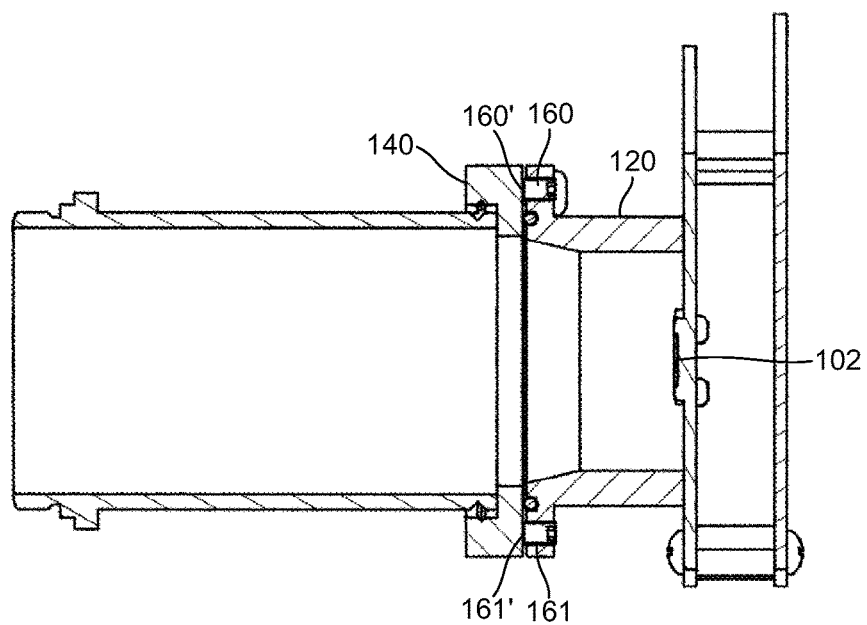
FIG. 4 is a cross-sectional view of the positioning mechanism of FIG. 2 illustrating jack screws in accordance with an embodiment of the present disclosure.

With further reference to FIGS. 1-3, and with reference to FIG. 4 (which illustrates a cross-section of the positioning mechanism 110 to demonstrate use of jack screws 160, 161 to properly position and align the optical device 101 relative to the image sensor 102), as shown, the jack screws 160, 161 can be threaded into the base 120. Ends 160', 161' of the jack screws can contact the adjuster 140. The jack screws 160, 161 can therefore be screwed in or out of the base 120 to adjust the position and/or orientation of the adjuster 140. For example, for primarily translational movement of the adjuster 140, all jack screws in contact with the adjuster 140 can be moved by substantially the same amount. For primarily rotational movement of the adjuster 140, at least one jack screw in contact with the adjuster 140 can be moved by a different amount than another jack screw in contact with the adjuster 140. This can cause the adjuster 140 to tilt relative to the base 120.

Figure 5:
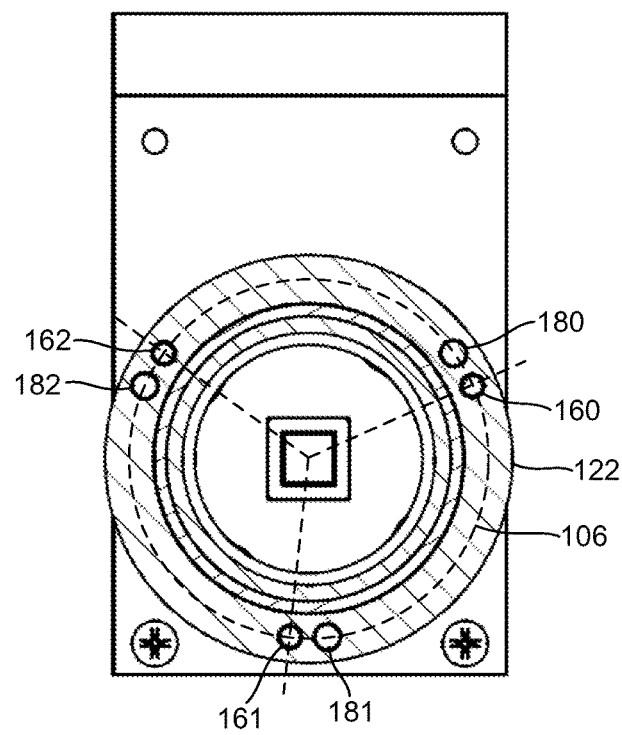
FIG. 5 is a cross-sectional view of the positioning mechanism of FIG. 2 illustrating locations of jack screws and fasteners in accordance with an embodiment of the present disclosure.
Figure 6:
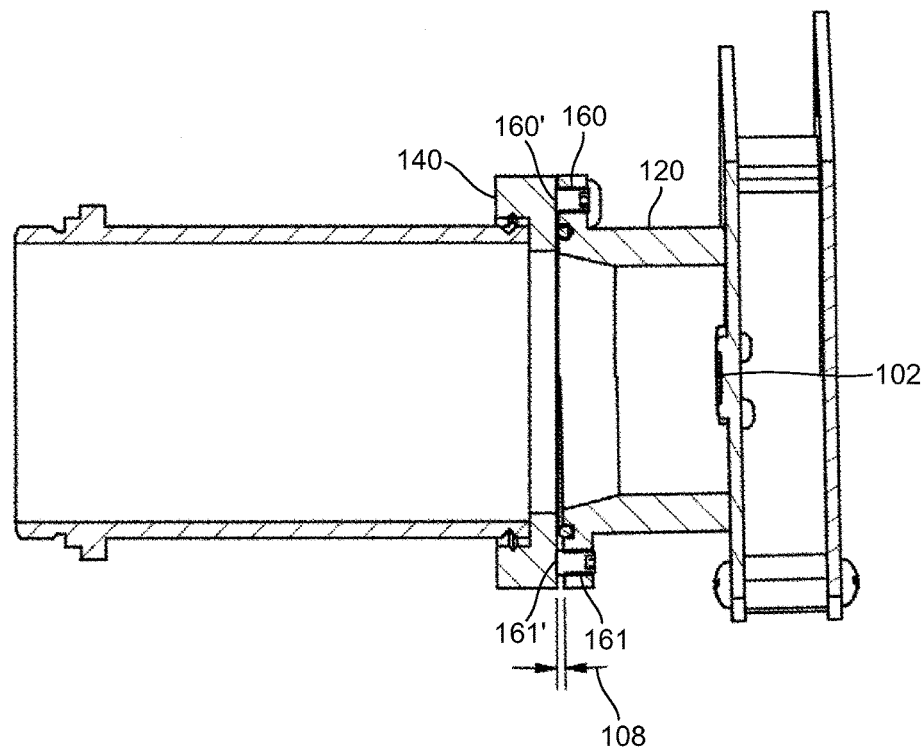
FIG. 6 is a cross-sectional view of the positioning mechanism of FIG. 2 illustrating jack screws providing movement in a rotational degree of freedom in accordance with an embodiment of the present disclosure.

For example, as shown in FIG. 5, three jack screws 160, 161, 162 can be threaded into the base 120. In one aspect, as illustrated, the three jack screws 160, 161, 162 can be disposed in a circular arrangement about a flange 122 of the base and located substantially equiangular from one another or, in other words, separated from one another by about 120 degrees about a circle 106. It should be recognized that this jack screw arrangement is not to be limiting, as other jack screw arrangements are contemplated. The jack screws 160, 161, 162 can therefore be adjusted to provide for rotational movement in two degrees of freedom. For example, as illustrated in FIG. 6, the end 160' of jack screw 160 can be positioned to provide minimal separation between the adjuster 140 and the base 120 in an area local to the jack screw 160. On the other hand, the end 161' of jack screw 161 can be positioned to provide a more substantial separation between the adjuster 140 and the base 120 in an area local to the jack screw 161. This difference in positions can allow the adjuster to tilt at an angle 108 relative to the base 120, which can provide for orientation alignment between the optical device 101 and the image sensor 102. By using at least three jack screws, orientation adjustments can be made in two rotational degrees of freedom. The adjuster 140 can therefore be positionable relative to the base 120 in a translational degree of freedom and two rotational degrees of freedom in order to facilitate alignment of the optical device 101 relative to the image sensor 102.

Although the jack screws 160, 161, 162 have been illustrated as being threaded into the base 120 and bearing on the adjuster 140, it should be recognized that jack screws can be threaded into the adjuster 140 and bearing against the base 120. Because jack screws are typically configured to bear against an object and not used to couple objects together, one or more fasteners can be used to couple the base 120 and the adjuster 140 to one another. In one aspect, as illustrated in FIG. 5, fasteners 180, 181, 182 can be paired with jack screws 160, 161, 162, respectively, to couple the adjuster 140 and the base 120. A paired jack screw and fastener can therefore couple in a push-pull relationship with one another to adjust and fasten the adjuster 140 to the base 120.

Figure 7:
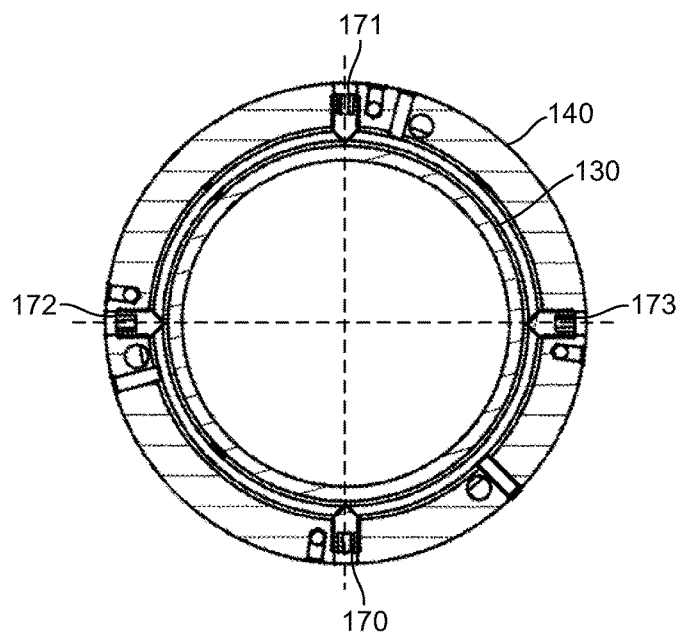
FIG. 7 is a cross-sectional view of the positioning mechanism of FIG. 2 illustrating locations of set screws in accordance with an embodiment of the present disclosure.

With further reference to FIGS. 1-3, and with reference to FIG. 7 (which illustrates a cross-section of the adjuster 140 and the tube 130 to illustrate further adjustment capabilities of the positioning mechanism 110), in one aspect, two set screws 170, 171 can be located substantially diametrically opposed to one another to provide for an adjustment in a translational degree of freedom. In another aspect, two set screws 172, 173 can be located substantially diametrically opposed to one another to provide for an adjustment in another translational degree of freedom. As shown, the set screws 170, 171, 172, 173 can be threaded into the tube 130. Opposing set screws 170, 171 can operate in tandem to provide for translation of the tube 130 relative to the adjuster 140. For example, set screw 170 can be in contact with the tube 130 and can be threaded out of the adjuster 140 by a given amount. On the other hand, the set screw 171 can be threaded into the adjuster 140 by substantially the same amount to maintain contact between the set screw 171 and the tube 130. This can cause the tube 130 to translate relative to the adjuster 140 in one translational degree of freedom. Set screws 172, 173 can be similarly operated in tandem to cause the tube 130 to translate relative to the adjuster 140 in another translational degree of freedom.

In one aspect, the set screws 170, 171, 172, 173 can be configured to provide two orthogonal translational degrees of freedom, as illustrated in FIG. 7. Additionally, the tube 130 can be rotated relative to the adjuster 140 about an axis extending out of the page to provide for relative movement between the tube 130 and the adjuster 140 in a rotational degree of freedom. Thus, the tube 130 can be positionable relative to the adjuster 140 in at least two translational degrees of freedom, and a rotational degree of freedom in order to align the optical device 101 relative to the image sensor 102. Moreover, when combined, the adjustment capabilities of the adjuster 140 relative to the base 120 and the adjustment capabilities of the tube 130 relative to the adjuster 140 provide for adjustability of the positioning mechanism 110 within at least three translational degrees of freedom and three rotational degrees of freedom.

Figure 8:
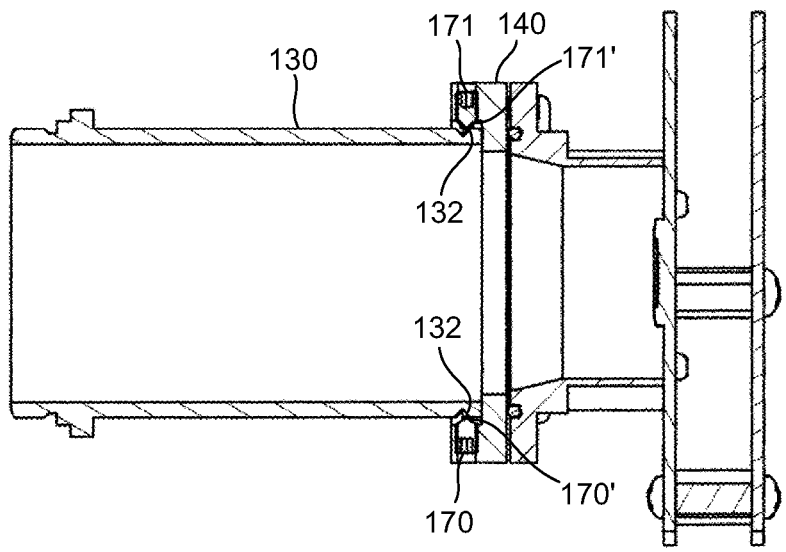
FIG. 8 is a cross-sectional view of the positioning mechanism of FIG. 2 illustrating set screws in accordance with an embodiment of the present disclosure.

With reference to FIG. 8, a cross-section of the positioning mechanism 110 illustrates how set screws 170, 171 can also be used to couple the tube 130 and the adjuster 140. For example, the tube 130 can include a groove 132 to interface with the set screws 170, 171. The groove 132 can be configured with an angled surface that can interface with angled tips 170', 171' of the set screws 170, 171, respectively. As the set screws 170, 171 are forced into the groove 132, the angled tips 170', 171' act against the angled surface of the groove to drive the tube 130 into contact with the adjuster 140. In one aspect, the interaction between the groove 132 and the set screws 170, 171 can be configured to induce a preload between the tube 130 and the adjuster 140. When in contact with one another, the interface between the tube 130 and the adjuster 140 can be configured to provide a seal to prevent dust or other debris from passing between the tube 130 and the adjuster 140, thereby forming part of a sealed enclosure for the optical device 101 and the image sensor 102 without requiring use of an O-ring or other elastomeric seal. The set screws can therefore perform the dual functions of providing adjustability and also coupling the tube 130 and the adjuster 140.

Although the set screws 170, 171, 172, 173 have been illustrated as being threaded into the adjuster 140 and bearing on the tube 130, it should be recognized that an adjuster and tube can be configured such that set screws can be threaded into the tube and to bear against the adjuster.

Figure 9:
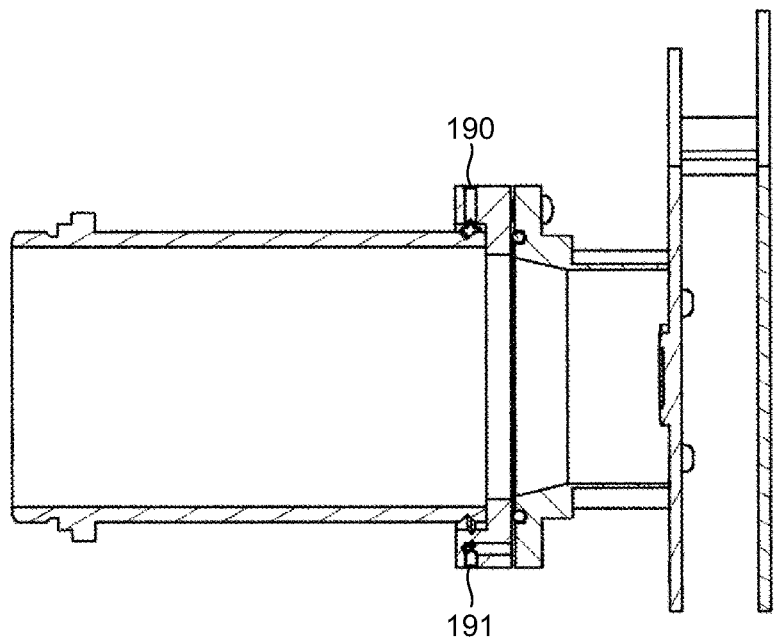
FIG. 9 is a cross-sectional view of the positioning mechanism of FIG. 2 illustrating adhesive ports in accordance with an embodiment of the present disclosure.

Once the positioning mechanism 110 has been properly adjusted, an adhesive or bonding cement can be used to bond the tube 130 and the adjuster 140 to one another and/or to bond the adjuster 140 and the base 120 to one another. Although the structures of the positioning mechanism 110 can be sufficient to maintain proper alignment and position between the optical device 101 and the image sensor 102, adhesive or bonding cement can be used for an added measure of security to further lock or secure the components of the positioning mechanism 110 in place. For example, as shown in FIG. 9, a cross-section of the positioning mechanism 110 illustrates adhesive ports 190, 191 for applying adhesive to secure the components of the positioning mechanism once properly adjusted. In one aspect, adhesive port 190 can be disposed in the adjuster 140 to allow an adhesive to bond the tube 130 and the adjuster 140 to one another. In another aspect, adhesive port 191 can be disposed in the adjuster 140 to allow an adhesive to bond the adjuster 140 and the base 120 to one another. It should be recognized that an adhesive port can be disposed in a tube, base, and/or adjuster in any combination or arrangement.

As set forth and explained herein, the positioning mechanism 110 can provide simple and easy positioning adjustment with the structures that are used to couple the optical device 101 to the image sensor 102, i.e. the base 120, the tube 130, the adjuster 140, the jack screws 160, 161, 162, the set screws 170, 171, 172, 173, and the fasteners 180, 180, 182. In other words, the positioning mechanism 110, independent of adhesive or bonding cement, can provide structural support for the alignment and coupling between the optical device 101 and image sensor 102. Although adhesive or bonding cement can be applied to lock the various components of the positioning mechanism in place, such is not required to obtain and/or maintain relative positions between the optical device 101 and image sensor 102.

In accordance with one embodiment of the present invention, a method of facilitating alignment of an optical device and an image sensor is disclosed. The method can comprise providing a positioning mechanism for aligning an optical device relative to an image sensor, the positioning mechanism having a base operable with a support for the image sensor, a tube operable with the optical device, and an adjuster disposed between the base and the tube. The method can further comprise facilitating movement of the adjuster relative to the base in a translational degree of freedom and two rotational degrees of freedom. Additionally, the method can comprise facilitating movement of the tube relative to the adjuster in two translational degrees of freedom, and a rotational degree of freedom.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A positioning mechanism for aligning an optical device and an image sensor, comprising:
    a base operable with a support for an image sensor;
    a tube operable with an optical device; and
    an adjuster disposed between the base and the tube,
      wherein the adjuster is positionable relative to the base along an axis in a translational degree of freedom and about two axes in two rotational degrees of freedom, and
      wherein, at an interface of the adjuster and the tube, the tube is positionable relative to the adjuster along two axes in two translational degrees of freedom, and about an axis in a rotational degree of freedom.

2. The positioning mechanism of claim 1, wherein the adjuster is positionable relative to the base by at least one jack screw, and wherein the tube is positionable relative to the adjuster by at least two set screws.

3. The positioning mechanism of claim 2, further comprising at least one fastener to couple the adjuster and the base.

4. The positioning mechanism of claim 2, wherein two of the at least two set screws are located substantially diametrically opposed to one another to provide for an adjustment in a first translational degree of freedom.

5. The positioning mechanism of claim 4, wherein two of the at least two set screws are located substantially diametrically opposed to one another to provide for an adjustment in a second translational degree of freedom.

6. The positioning mechanism of claim 4, wherein the at least two set screws are threaded into the adjuster.

7. The positioning mechanism of claim 2, wherein the tube includes a groove to interface with the at least two set screws.

8. The positioning mechanism of claim 7, wherein an interaction between the groove and the at least two set screws is configured to induce a preload between the tube and the adjuster.

9. The positioning mechanism of claim 2, wherein the at least one jack screw comprises three jack screws to provide for an adjustment in a translational degree of freedom and two rotational degrees of freedom.

10. The positioning mechanism of claim 9, wherein the three jack screws are located about a circle substantially equiangular from one another.

11. The positioning mechanism of claim 9, further comprising a fastener paired with each of the three jack screws to couple the adjuster and the base.

12. The positioning mechanism of claim 2, wherein the at least one jack screw is threaded into the base.

13. The positioning mechanism of claim 1, further comprising an o-ring disposed between the adjuster and the base.

14. The positioning mechanism of claim 1, further comprising an adhesive port in the adjuster to allow an adhesive to bond the adjuster and the base to one another.

15. The positioning mechanism of claim 1, further comprising an adhesive port in the adjuster to allow an adhesive to bond the tube and the adjuster to one another.

16. An optics system, comprising:
    an optical device;
    an image sensor mounted on a support; and
    a positioning mechanism for aligning the optical device and the image sensor, the positioning mechanism having
      a base coupled to the image sensor support,
      a tube coupled to the optical device, and
      an adjuster disposed between the base and the tube,
      wherein the adjuster is positionable relative to the base along an axis in a translational degree of freedom and about two axes in two rotational degrees of freedom, and
      wherein, at an interface of the adjuster and the tube, the tube is positionable relative to the adjuster along at least two axes in at least two translational degrees of freedom, and about an axis in a rotational degree of freedom to align the optical device relative to the image sensor.

17. The optics system of claim 16, wherein an overall stacked length of the base, tube, and adjuster is sized to provide a suitable distance between the optical device and the image sensor.

18. The optics system of claim 16, wherein the positioning mechanism forms part of a substantially sealed enclosure for the image sensor.

19. The optics system of claim 16, further comprising an adhesive that bonds the tube and the adjuster to one another and that bonds the adjuster and the base to one another.

20. A method of facilitating alignment of an optical device and an image sensor, comprising:
    providing a positioning mechanism for aligning an optical device relative to an image sensor, the positioning mechanism having
      a base operable with a support for the image sensor,
      a tube operable with the optical device, and
      an adjuster disposed between the base and the tube;
    facilitating movement of the adjuster relative to the base along an axis in a translational degree of freedom and about two axes in two rotational degrees of freedom; and
    facilitating, at an interface of the adjuster and the tube, movement of the tube relative to the adjuster along two axes in two translational degrees of freedom, and about an axis in a rotational degree of freedom.

* * * * *